US012465043B1

(12) United States Patent
Radford

(10) Patent No.: US 12,465,043 B1
(45) Date of Patent: Nov. 11, 2025

(54) PORTABLE HAND-HELD DEVICE UTILIZED TO DETER A CANINE ATTACK

(71) Applicant: Anthony Radford, Fayetteville, GA (US)

(72) Inventor: Anthony Radford, Fayetteville, GA (US)

(73) Assignee: Radford Enterprisses. LLC, Alpharetta, GA (US)

( * ) Notice: Subject to any disclaimer, the term of this patent is extended or adjusted under 35 U.S.C. 154(b) by 167 days.

(21) Appl. No.: 18/142,081

(22) Filed: May 2, 2023

(51) Int. Cl.
A01M 29/16 (2011.01)
G10K 15/04 (2006.01)

(52) U.S. Cl.
CPC ............. *A01M 29/16* (2013.01); *G10K 15/04* (2013.01)

(58) Field of Classification Search
CPC ................................ A01M 29/16; G10K 15/04
See application file for complete search history.

(56) References Cited

U.S. PATENT DOCUMENTS

| 5,769,032 A * | 6/1998 | Yarnall, Sr. .......... | A01K 15/023 119/908 |
| 7,173,534 B1 * | 2/2007 | Markham ........... | A01M 31/002 340/573.2 |
| 2003/0058740 A1 * | 3/2003 | Jincks ................. | A01M 31/002 367/139 |

* cited by examiner

Primary Examiner — Daniel Pihulic

(57) ABSTRACT

An animal deterrent device is generally shown. The animal deterrent device utilizes smart technology to deter an animal from coming close to a person holding the device or breaking apart two animals that are fighting without having to get physically involved. The device includes a first shell coupled to a second shell via fasteners. The device also includes one or more transducers configured to emit a sound wave. The transducer is controlled by a processor that includes a signal processing module and an analytics machine, amongst other components. The processor is configured to optimize the sound wave emitted by the transducer to provide a directional sound wave of a particular frequency, ranging from 10 kHz to 45 kHz, to keep an animal away.

20 Claims, 7 Drawing Sheets

PORTABLE HAND-HELD DEVICE UTILIZED TO DETER A CANINE ATTACK

FIELD OF THE INVENTION

The present invention generally relates to hand-held devices utilized to prevent and protect against aggressive animal behaviors and, more particularly, to a portable hand-held device that is capable of generating a directionally focused frequency sound to deter or otherwise halt aggressive animal behavior, particularly in canines, that unfettered would result in a canine attack.

BACKGROUND OF THE INVENTION

There is a certain joy to being a pet owner. Particularly being a dog owner. After all, a dog is man's best friend, which is true given a dog's predisposition to remain loyal to its owner regardless of the circumstances. This is perhaps why dog owners love their dogs with passion and want the absolute best for them regardless of the cost. Relationship between man and dog has certainly changed in recent years since the spread of COVID. Before COVID, a dog was left at home for several hours a day, patiently waiting for the return of its master. After COVID, however, a dog no longer had to wait for its master to come home because they worked from home. The work and life dynamic despite COVID pandemic restrictions being removed has persisted and indeed been enhanced as people have gotten used to always being accompanied by their dog, taking them everywhere they eat, shop, or visit. Indeed, mainstream media has produced commercials addressing the COVID effect has had on dogs and the newfound amount of time they now have with their owners.

Part of owning a dog includes feeding the dog, giving the dog attention, and taking the dog on walks. Taking a dog on a walk is arguably the dog's favorite activity of the day, apart, perhaps, from lying down and taking a nap on the unattended off-limit bed or sofa or getting a long belly rub. During a walk, a dog is otherwise preoccupied with doing its necessities and smelling anything and everything that calls its attention. Unquestionably, going outside brings joy to the animal. Although a dog may love its owner and is friendly with other humans, depending on the breed and temperament of the dog, the dog may not be so friendly to other dogs. Indeed, there are dog breeds that are known for their friendliness and loyalty to humans but reviled their disdain for other dogs encroaching on their territory or coming near their humans. This engrained behavior can result in unexpected fights between otherwise domesticated, friendly dogs. According to the American Pet Products Association's (APPAY) 2021-2022 National Pet Owners Survey, 63.5 million US households own a dog, which represents 50.1% of American households. Many of these dogs escape from their homes, yards, vehicles, and leashes, exhibiting unpredictable behavior when unleashed, exacerbating the ongoing dog attack problem in the U.S.

Another common scenario that leads to unexpected dog fights is when a person walks his or her dog, and a stray known to the area picks up their scent. Unfortunately, some strays are accustomed to a difficult lifestyle having to scrap for every meal, oftentimes going hungry for days at a time which makes them extremely aggressive, or they have a history of being abused, leading them to be mistrustful of anyone or anything. The lack of consistency in meals, history of their abuse, and other territorial factors may lead a stray to attack a person or dog walking within the dog's territory.

When a dog fight occurs, a dog owner will often not hesitate to jump into an uncontrolled brawl between the two dogs and, with their own hands, try to pry the two unhinged dogs away from one another. Unsurprisingly, this exercise in bravery, or as some who do not have pets would put it, a total disregard for their safety, often results in injuries to the dogs, the person(s), or, often, everyone involved. Other times, in the most desperate of moments, a person may opt to use a weapon to de-escalate the attack to put down the attacking animal to otherwise avoid a more serious injury or death.

A dog fight or attack is generally worrisome to dog owners walking the streets or people terrified of animals. The mainstream media, however, is not interested in covering nonpolarizing news, such as dog attacks, unless the dog attack leads to a serious injury or death of a person or child. Notwithstanding the lack of notoriety, there are over 4.5 million dog bites yearly in the United States, with nearly 800,000 bites requiring medical attention due to trauma, infections, and transmittable diseases. Accordingly, dog attacks and fights are a real concern for the everyday American.

To prevent dog attacks, some pet owners walk around with animal control attack deterrent devices. These devices include bite sticks, sprayers, canisters with deterrent sprays, tasers, stun guns, or dog whistles. These devices, however, are often unreliable, difficult to carry with the person while walking their dog, too expensive, prone to malfunctioning, or are simply not effective as a dog attack or fight deterrent. Moreover, these devices require that the attacking dog gets in close proximity to the person and his dog before utilizing the deterrent device, which by that time, could be too late to deploy the safety deterrent because doing so will injure the person's pet causing serious injury.

Accordingly, there is a need for a device that is easy to operate, carry while walking a dog, and utilize to effectively deter an impending attack from a dog without having to engage the attacking dog physically.

SUMMARY OF THE INVENTION

The present invention is directed to a device for deterring an impending attack from an animal, such as a canine, without having to engage the attacking dog physically. Introducing a first embodiment of the invention, the present invention consists of an animal deterrent device, comprising a main body that may include a first shell portion removably coupled to a second shell portion. The first and second shell form a housing that includes an internal space. The device also includes a transducer disposed of within the internal space of the housing, and the transducer is configured to emit a sound wave. Disposed about the frame of the device is also a camera, a speaker, and a microphone. Inside of the frame is a microprocessor in communication with the microphone, speaker, and camera configured to execute one or more processes stored in memory, the microprocessor performs several operations, which include but are not limited to, at a signal processing module, capturing environmental sounds captured by the microphone and processing the environmental sounds as data to enhance and amplify at least one directional sound wave; at an analytics machine, automatically analyzes the data to optimize the directional sound wave, and at a sound emitting control module communicates with the signal processing module and analytics machine to send a signal to the transducer to emit the directional sound wave at a frequency capable of maintaining an animal at a distance; and at an object recognition module, receiving image data captured by the camera and comparing the data against known object values stored in memory. The microprocessor also performs a determination step in one exemplary embodiment. The determination step includes determining if the data does not include a known object value (i.e., recognizes a canine), then nothing occurs (i.e., the transducer is not triggered). Alternatively, if the data includes a known object value (i.e., a canine is recognized), the sound emitting control module is signaled to automatically send a signal to the transducer to emit the directional sound wave. The device also includes a power source for powering the electrical components mentioned above and a switch capable of interrupting the energy supply from the power source powering the components.

In another aspect, the first shell coupled to the second shell portion forms a frame, and the frame comprises a handle portion, a head portion, and a shoulder portion. More particularly, in one exemplary embodiment, the handle portion includes a compartment space and a removable cover securely fastened to the handle to cover the compartment space. The compartment space is for storing the power supply and the microprocessor of the device. The head portion includes an outer frame with structural supports to provide rigidity and a housing compartment for storing the transducer. The shoulder portion supports the head portion of the frame and includes a pair of flaring arms that are attached to the head portion on one end and the handle portion the opposite end.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The phrase "and/or," as used herein, should be understood to mean "either or both" of the elements so joined, i.e., elements that are conjunctively presented in some cases and disjunctively presented in other cases.

As used herein, an element or step recited in the singular and proceeded with the word "a" or "an" should be understood as not excluding plural elements or steps, unless such exclusion is explicitly recited.

The term microprocessor, as used herein, refers to central processing units, processors, microcontrollers, reduced instruction set circuits (RISC), application specific integrated circuits (ASIC), logic circuits, and any other circuit or processor capable of executing the functions described herein. As used herein, the terms "software" and "firmware" are interchangeable, and include any computer program stored in memory for execution by the processor, including RAM memory, ROM memory, EPROM memory, EEPROM memory, and non-volatile RAM (NVRAM) memory. The above memory types are exemplary only and are thus not limiting as to the types of memory usable for storage of a computer program.

Figure 1:
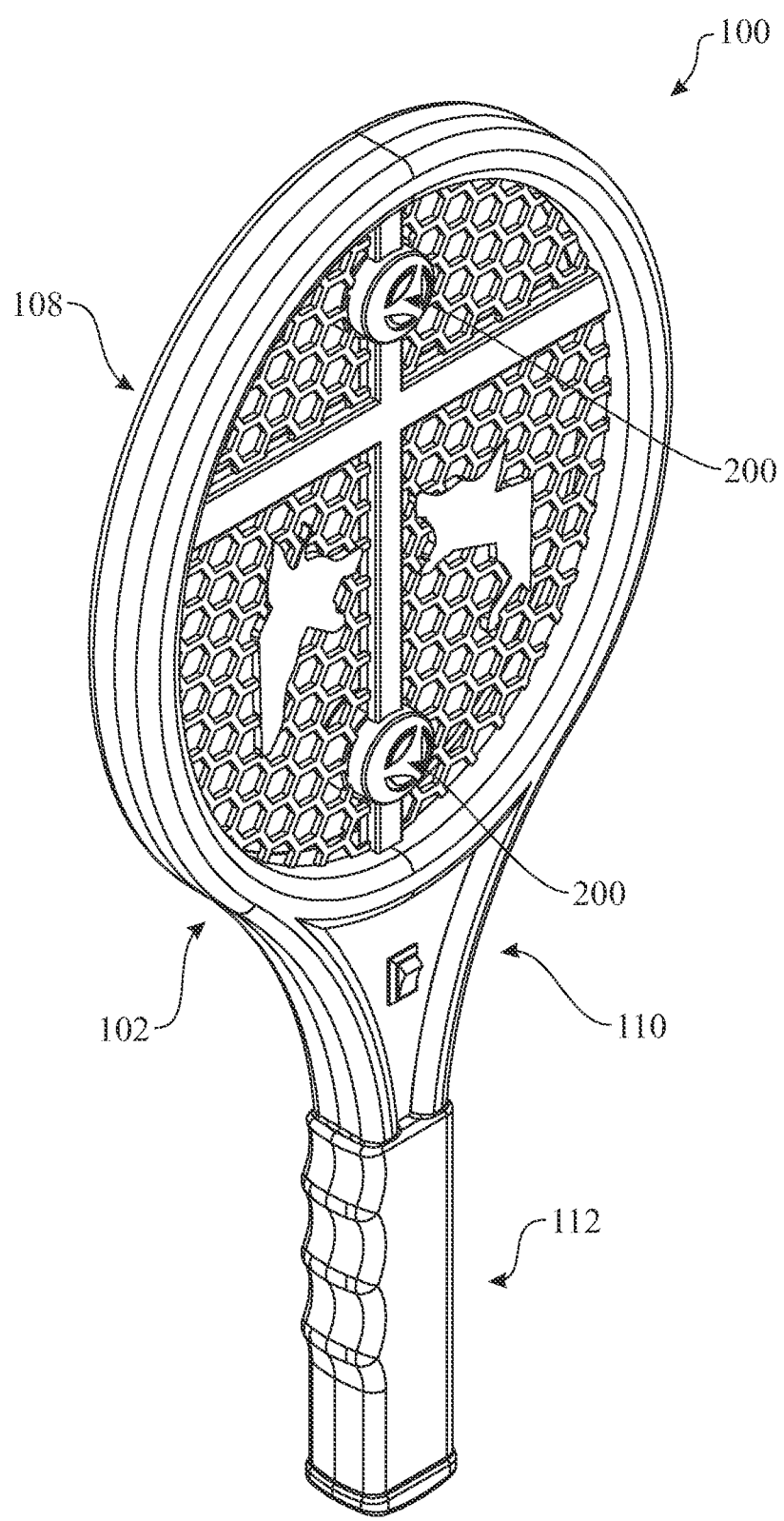
FIG. 1 presents a front perspective view of a canine deterrent device in accordance with the present invention.
Figure 2:
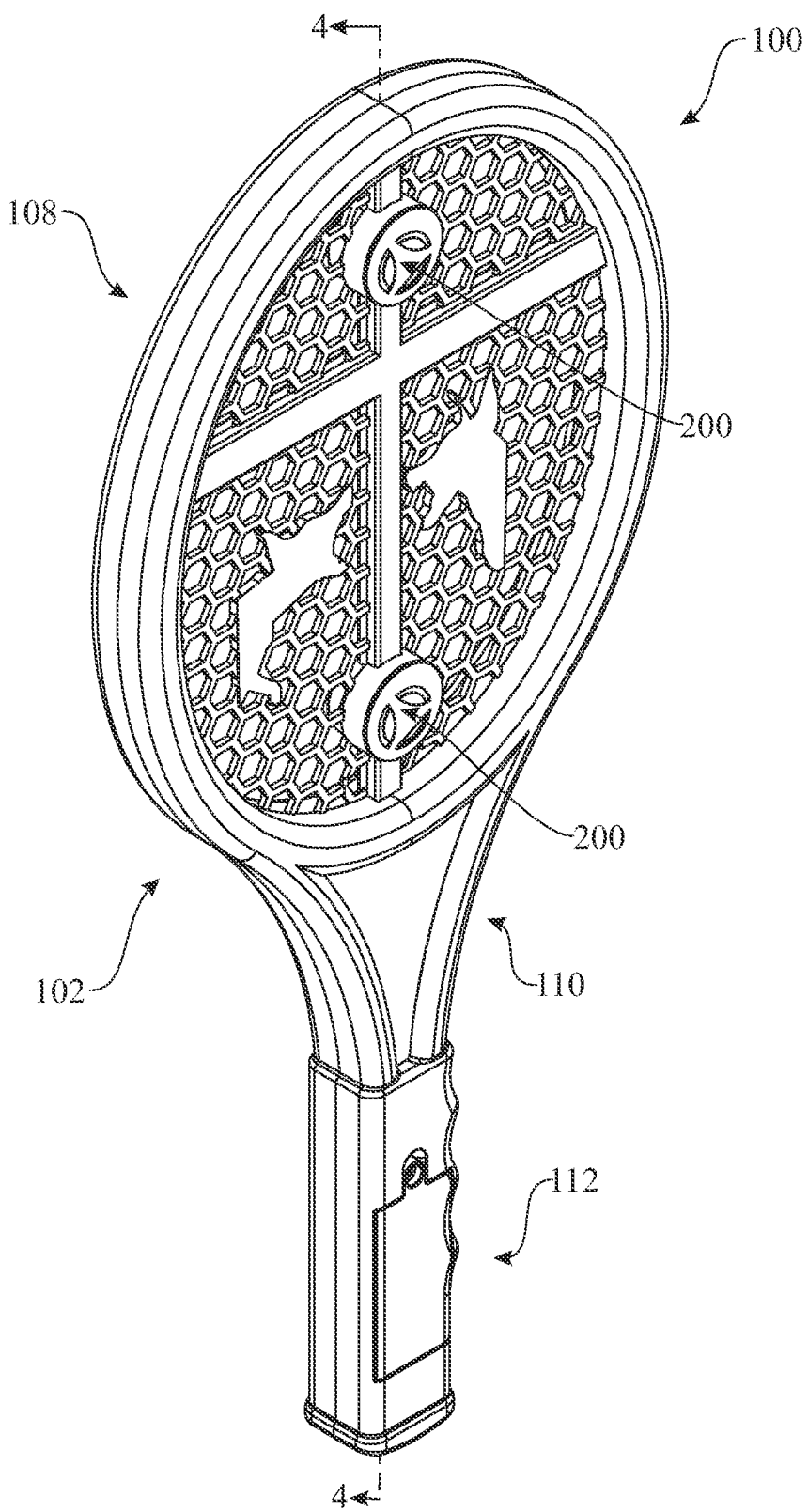
FIG. 2 presents a rear perspective view of the canine deterrent device shown in FIG. 1 in accordance with the present invention.

Referring initially to FIGS. 1 through 4, a portable hand-held canine deterrent device 100 (hereinafter "canine deterrent device") is generally shown in accordance with the present invention. The canine deterrent device 100 generally comprises a main body 102, one or more sound transducers 200, a microprocessor 300 capable of executing one or more commands stored in memory, and a power source 206 for powering the electrical components of the instant device. The canine deterrent device 100, in one exemplary embodiment, comprises a first shell portion 104 that is removably coupled to a second shell portion 106 via fasteners fastened to fasteners holes 147 disposed on at least one shell. The first shell portion 104 and the second shell portion 106 of the main body 102 each include a head portion 108, a shoulder portion 110 supporting the head portion 108, and a handle portion 112 extending below the shoulder portion 110 of the canine deterrent device 100. As illustrated in FIG. 1, the canine deterrent device 100, namely, the main body 102 of the present invention, may appear or otherwise include the body configuration of a tennis racket that includes a round head portion, narrowing shoulders, and a handle. The canine deterrent device 100, however, may comprise alternative body configurations. For instance, the head portion 108 of the main body may include a rectangular shape, oval shape, square shape, or polygonal shape. The size of the canine deterrent device 100 may also vary in scale. The canine deterrent device 100 may include a handle and head portion but no shoulder portion (i.e., the head connects to the handle). Accordingly, the foregoing should be understood to be exemplary and not limiting. Moreover, the main body 102 of the canine deterrent device 100 of the instant invention may be made out of aluminum or plastics, such as polymethyl methacrylate (PMMA), polycarbonate (PC), polyethylene (PE), polypropylene (PP), polytheylene terephthalate (PETE), polyvinyl chloride (PVC), or acrylonitrile-butadiene-styrene (ABS) to name a few.

Figure 3:
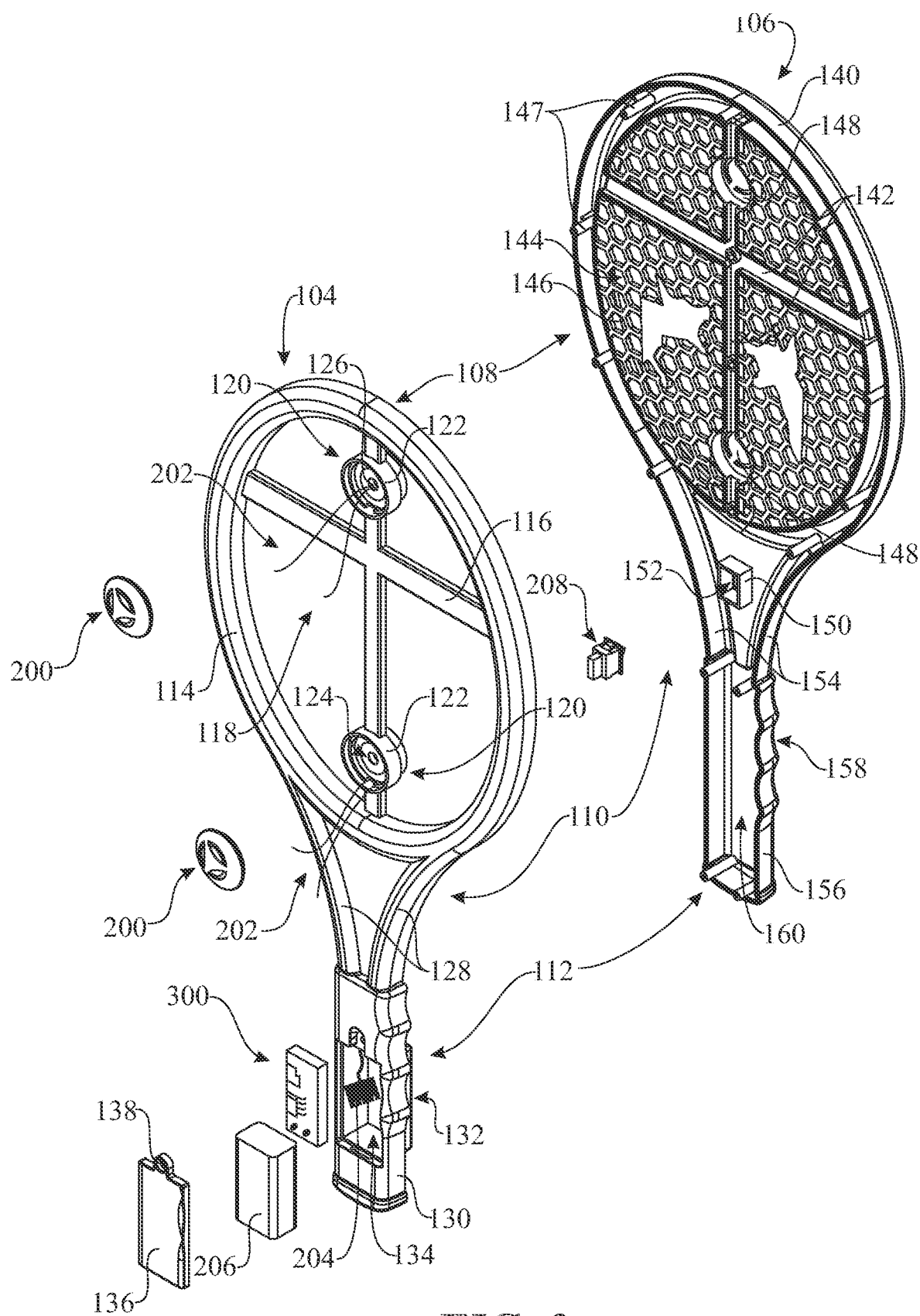
FIG. 3 presents an exploded, rear perspective view of the canine deterrent device showing the device's internal components in accordance with the present invention.
Figure 4:
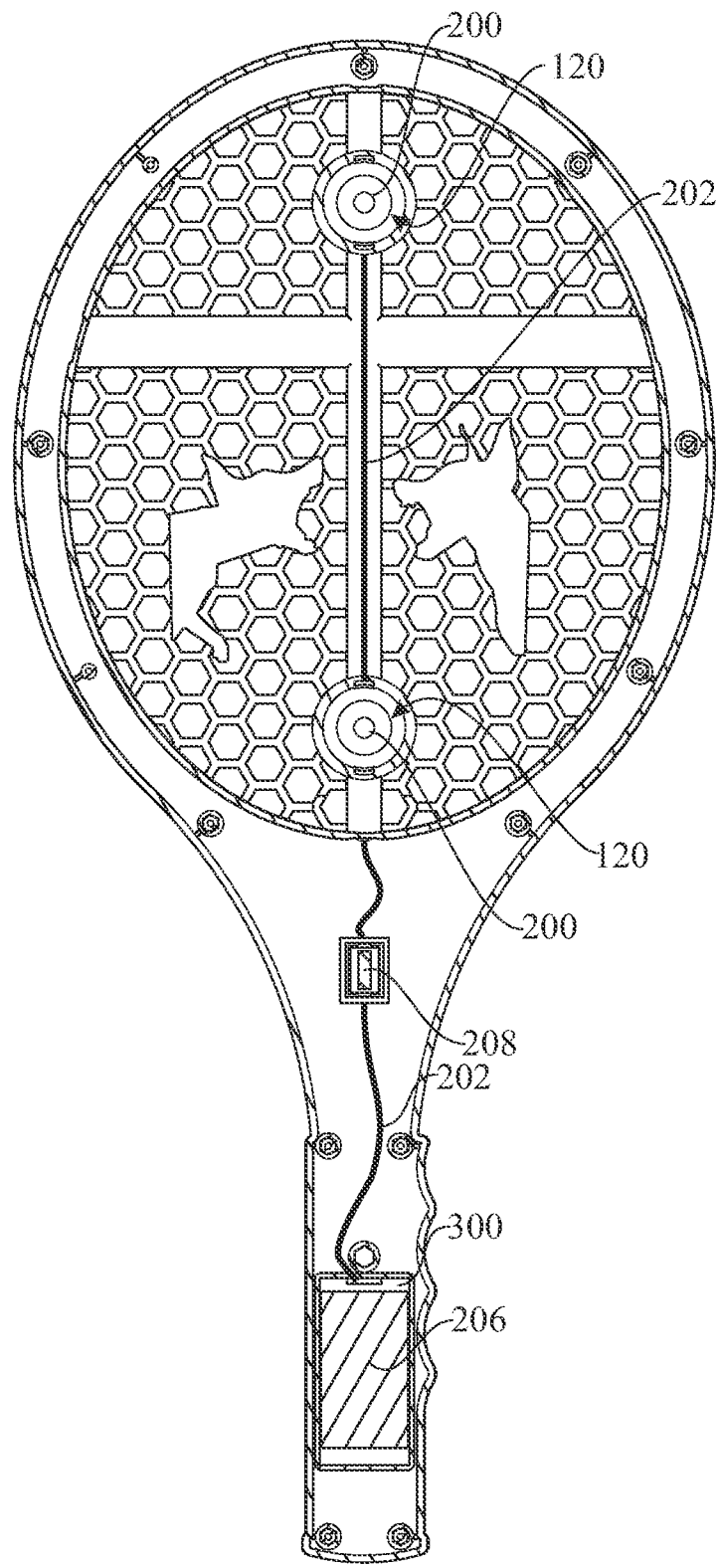
FIG. 4 presents a cross-section view of the canine deterrent device taken along section lines 4-4 shown in FIG. 2, showing the internal components of the instant device in their respective positions.

With particular reference to FIGS. 1 and 3, as mentioned above, the main body 102 of the canine deterrent device 100 in one exemplary form comprises a first shell portion 104 and a second shell portion 106. The first shell portion 104 generally includes a frame 114 having one or more supports 116 that provide structural integrity to the frame 114 itself. As illustrated, the supports 116 may be arranged in a cross pattern along the interior portion of the circular frame 114 and provide openings 118 whereupon inserts, such as honeycomb inserts 146 are disposable therein. In this particular configuration, a support is longitudinally positioned and axially aligned with the handle portion 112 of the first shell 104. A second support 116 is transversely positioned, or normal, to the longitudinal support 116 to provide four openings 118 where inserts are removably disposable. The supports and their positioning, however, may be varied to provide additional structural support if necessary. The first shell 104 of the main body 102 of the canine deterrent device 100 also includes one or more transducer housings 122. The transducer housings 122 comprise an upstanding continuous sidewall 122 extending from a bottom surface 126 that includes an opening to form a cavity 124. The cavity 124 is sized and shaped to retain a sound transducer 200. In one exemplary form, the transducer housing 122 is positioned on a support member 116, with one housing 122 positioned inferior/superior to another along the axial line of the handle portion 112 of the canine deterrent device 100. The positioning of the transducer housings 122 maximize the sound emissions to create a funneled beam to provide an effective sound shield against an attacking canine (See e.g., FIG. 5). Of course, one will appreciate that the positioning of the housings 122, and in turn the sound transducers 200, may be changed depending on the shape and size of the head portion of the canine deterrent device to maximize the sound emissions to provide an effective sound shield, where such changes would be without departing from the scope of the invention.

Supporting the head portion 108 of the first shell 104 of the main body 102 of the canine deterrent device 100 is a pair of support arms 128 that make up the shoulder portion 110 of the instant device. As illustrated, the support arms 128 may comprise a pair of flaring arms that are narrow at a first end and wider at a second end. Attached to a bottom end of the neck portion 110 is a handle portion 112. The handle portion 112, in one exemplary embodiment, comprises a handle body 130 that may include one or more handle grooves 132 for griping purposes, a compartment 134 for storing electrical components, such as a power source 206 and a microprocessor 300, a compartment cover 136 for covering the compartment 134 and a security mechanism 138 for securing the compartment cover 136 to the compartment 134 to secure the electrical components therein. One will appreciate that compartment cover 136, in one exemplary embodiment, may include a rubberized gasket to provide a water-tight seal when secured to compartment 134 to prevent any type of water or moisture from entering and reaching the electrical components of the canine deterrent device 100.

With continued reference to FIGS. 1 and 3, the main body 102 of the canine deterrent device 100 includes a second shell 106, removably attachable to the first shell 104. The second shell 106 generally comprises a frame 140 that includes one or more supports 128 that provide structural integrity to the frame 140 itself. As illustrated, the supports 128 may be arranged in a cross pattern along the interior portion of the circular frame 140 and provide openings 144, whereupon inserts, such as honeycomb inserts 146 are disposable therein. In this particular configuration, a support 128 is longitudinally positioned and axially aligned with the handle portion 112 of the second shell 106. A second support 142 is transversely positioned, or normal, to the longitudinal support 142 to provide four openings 144 where inserts 146 are removably placed. The number of supports and their positioning, however, may be varied to provide additional structural support if necessary. The second shell 106 of the main body 102 of the canine deterrent device 100 also includes one or more transducer covers 148 that snap or coupled to the transducer housing 120.

Similar to the first shell 104, supporting the head portion 108 of the second shell 106 of the main body 102 of the canine deterrent device 100 is a pair of support arms 128 that make up the shoulder portion 110 of the instant device. As illustrated, the support arms 154 may comprise a pair of flaring arms that are narrow at a first end and wider at a second end. Disposed on the shoulder portion 110 of the second shell 106 is a switch compartment 150 for holding an electronic switch 208 therein. Attached to a bottom end of the neck portion 110 is a handle portion 112. The handle portion 112, in one exemplary embodiment, comprises a handle body 156 that that may include one or more handle grooves 158 for griping purposes and a cavity 160 for receiving the compartment 134 storing the electrical components of the present invention therein. The two shells coupled together can be readily seen in FIG. 1. One or both shells may include a rubberized gasket disposed of around an inner surface frame perimeter to provide a water-tight seal between the two shells and prevent any type of water or moisture from entering and reaching the electrical components of the canine deterrent device 100.

Referring now to FIGS. 1, 3 through 5, and 7, the canine deterrent device 100 includes a plurality of electronic components that together work in tandem to emit one or more sound beams 224 to provide a sound shield or wall 226. A sound wall is understood as a field of sound clustered together to form a sound wall that travels a certain distance of space. The electrical components comprise, in one exemplary embodiment, a microprocessor 300, a sound transducer 200, a power supply 206, wiring 202 (in some embodiments where wireless communication is not utilized), and an electronic switch 208. As seen in FIG. 3, the sound transducer 200 of the present invention may be housed within housing 120 and connected to wires 202 that connect to the electronic switch 208 and the microprocessor 300, all powered by the power source 206. In one exemplary embodiment, the power source 206 may include a rechargeable lithium-ion battery, alkaline battery, carbon zinc battery, silver oxide battery, or zinc-air battery. The sound transducer 200 of the present invention is configured to detect and emit acoustic waves at various frequencies, ranging from 10 kHz to around 45 kHz. In one exemplary embodiment, the sound transducer 200 converts electrical signals emitted from the microprocessor carried by the wires into sound. The sound transducer may include circuitry that comprises a microphone connected to one or more resistors, capacitors (including ceramic capacitors), and transistors that are grounded and connected to a speaker. The speaker may comprise, in one exemplary embodiment, an 8 ohms, 5-watt speaker. Alternative speaker configurations, however, may be utilized without departing from the scope of the present invention.

Figure 7:
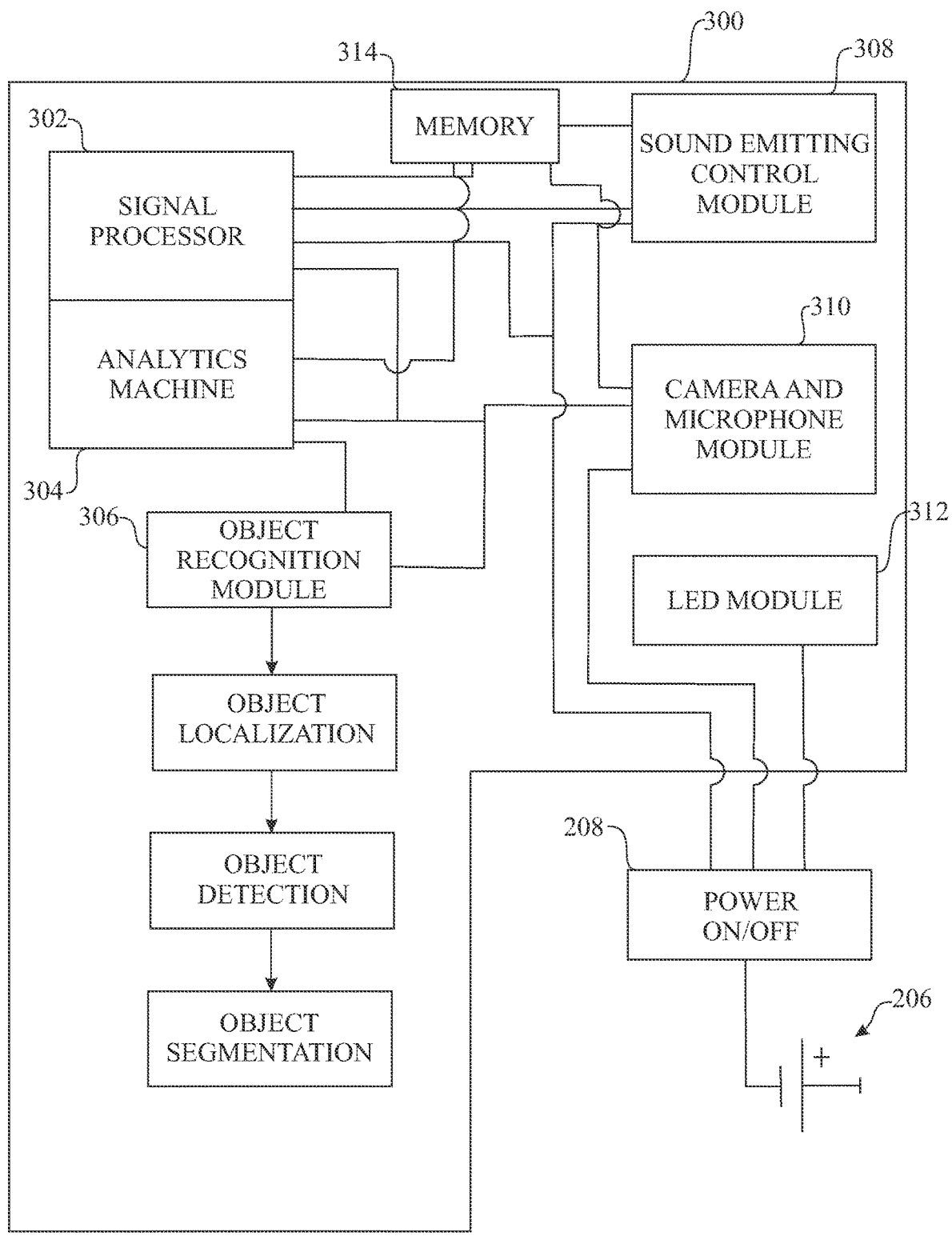
FIG. 7 presents a schematic diagram of an exemplary embodiment of the sound deterrent processor used to control the direction, intensity, and frequency of the sound-emitting beams emitted from the canine deterrent device to ward off a canine attack in accordance with the present invention.

Referring particularly to FIGS. 3 and 7, the canine deterrent device includes a microprocessor that includes a signal processor 302, an analytics machine 304, object recognition module 306, sound emitting control module 308, a camera and microphone module 310, and LED module 312 that connect to the switch 208. In one exemplary form, the signal processor 302 of the canine deterrent device 100 is configured to capture signals picked up from the device's microphone and transform those signals into usable data that is analyzed by the analytics machine 304. The information analyzed and gathered by the signal processor 302 and analytics machine 304 is utilized to communicate with the sound emitting control module 308 of the microprocessor 300 of the canine deterrent device 100 to produce an effective sound shield 226. For instance, signal processing by the canine deterrent device 100 includes analyzing the audio signals received in the form of data to enhance the quality and directionality of the sound beams 224 emitted by the sound transducers 200 of the present invention. In some exemplary forms, enhancement of the sound captured for processing and emission of effective beaming of sound is done through known techniques such as, filtering, equalization, or beamforming. Filtering is used to remove unwanted frequencies from the sound signal, such as background noise, to improve the clarity of the sound. Equalization is used to adjust the balance of different frequencies in the sound signal to make it more natural. Beamforming is a technique used to shape the sound beam so that it is directed toward a specific location.

The analytics machine is utilized to create a highly advanced directional sound beam that is adaptable to different environments, e.g., environments with loud noises and locations susceptible to echoing, and provides high-quality directional sound. For example, the analytics machine includes one or more executable commands to learn patterns and other data picked up by the microphone and processed by the signal processor about the user's surroundings. Based on the data collected, the analytics machine tweaks the sound emissions emitted by the transducers 200. The tweaks in sound, in one exemplary embodiment, may include variations in the electrical loads that are processed by the transducer to emit sound beams of varied frequencies. In one exemplary embodiment, the analytics machine may include a supervised learning algorithm or an unsupervised approach. Under a supervised learning algorithm, classified data captured by the device or regressed data are used to learn. Understood supervised learning algorithms include but are not limited to decision tree structures learning, support vector machine learning, naïve bayes learning, linear regression learning, and logistic regression learning. In an unsupervised algorithm approach, raw data is given to the analytics machine to evaluate the relationships between the data provided. Unsupervised algorithms include clustering (i.e., sorting unlabeled data points into pre-defined clusters), K-means clustering (i.e., taking in the pre-determined clusters and plotting out all the data regardless of the cluster. The processes includes plotting a randomly selected piece of data as the centroid for each cluster. From there, it sorts the remaining data points into clusters based on their proximity to each other and the centroid data point for each cluster), or gaussian mixture model (i.e., sorting data into pre-determined clusters based on proximity). All of the executable commands by the signal processor and analytics machine are stored in the processor's memory 314.

Figure 5:
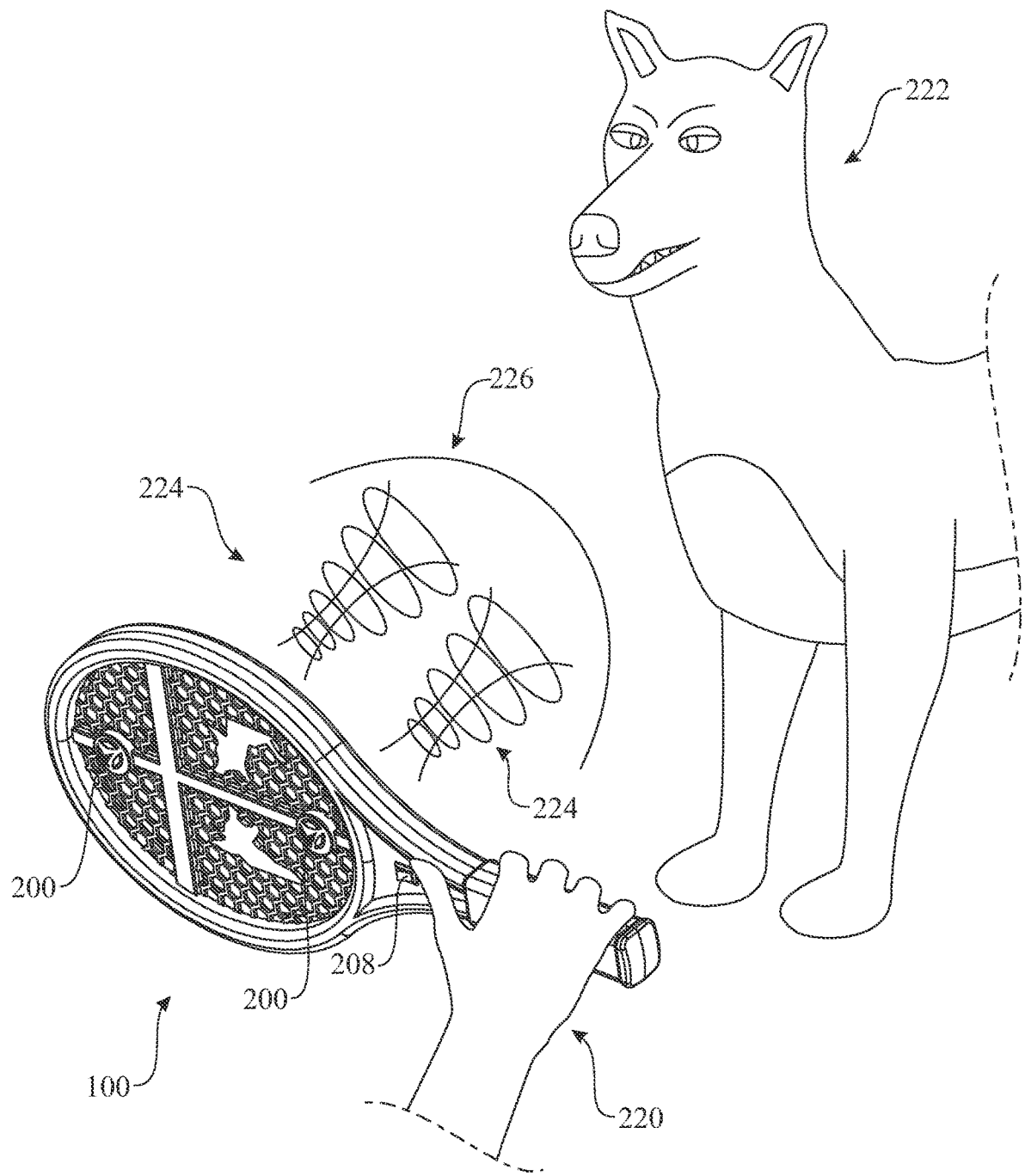
FIG. 5 presents a perspective view of the canine deterrent device being utilized to emit a deterring sound that forms a sound shield that is highly effective on canines.

With reference now to FIG. 5, an exemplary embodiment is shown how the canine deterrent device 100 is utilized to ward of an approaching canine 222. In this example, a user walking alone or walking his animal encounters an unsuspected canine 222 that appears to be aggressive. The user toward of the canine extends the user's hand 220 holding the canine deterrent device and points the transducers 200 in the direction of the aggressive canine 222. The user then activates the device by pressing the power switch 208 on the device to energize the electrical components of the device. In doing so, the transducers 200 begin to emit sound waves of a certain frequency. The frequency may vary depending on the canine. As discussed above, the canine device's processor, namely, the analytics machine and signal processor, automatically begins to analyze data and send a signal to the sound emitting control module 308 of the processor to modify the frequency emitted through the transducers toward the canine 222 (FIG. 7). The sound beams 224 emitted from the transducers 200 combined make an invisible to the eye sound shield 226 that deters the canine 222 approaching the user.

Figure 6:
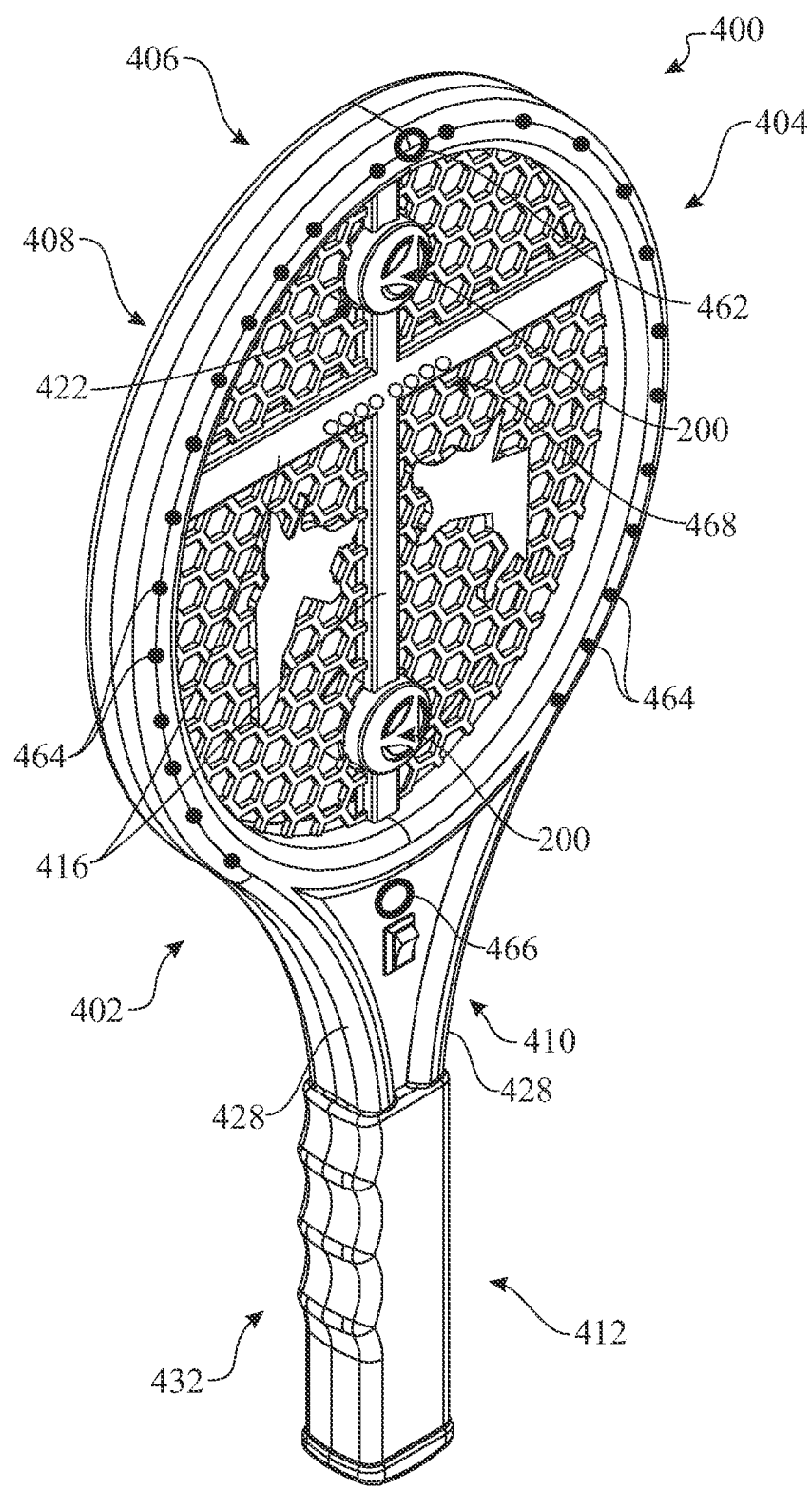
FIG. 6 presents a front perspective view of the canine deterrent device in a second exemplary embodiment, which includes a plurality of LED lights arranged in a daisy-chain fashion and a camera and microphone device in accordance with the present invention.

Turning now to FIGS. 3 and 6, in an exemplary alternative embodiment, a secondary canine deterrent device 400 is generally shown. The canine deterrent device 400 generally comprises similar components as the canine deterrent device 100 illustrated in FIG. 1, with a few additional components. Accordingly, similar components of the canine deterrent device 400 are numbered the same as the canine deterrent device 100 with the reference number prefixed with '4' instead of '1.' The canine deterrent device 400 generally comprises a main body 402, one or more sound transducers 200, a microprocessor capable of executing one or more commands stored in memory, and a power source for powering the electrical components of the instant device. The canine deterrent device 400, in one exemplary embodiment, comprises a first shell portion 404 that is removably coupled to a second shell portion 406 via fasteners on at least one shell. The first shell portion 404 and the second shell portion 406 of the main body 402 each include a head portion 408, a shoulder portion 410 supporting the head portion 408, and a handle portion 412 extending below the shoulder portion 410 of the canine deterrent device 400.

The first shell portion 404 and the second shell portion 406 generally include a frame having one or more supports 416 that provide structural integrity to the frame itself. As illustrated, the supports 416 may be arranged in a cross pattern along the interior portion of the frame. The canine deterrent also includes one or more transducers 200 housed in a transducer housing 422, with the transducers 200 configured to emit a sound beam. The positioning of the transducer housings 122 maximizes the sound emissions to create a funneled beam to provide an effective sound shield against an attacking canine (See e.g., FIG. 5). Of course, one will appreciate that the positioning of the housings 422, and in turn the sound transducers 200, may be changed depending on the shape and size of the head portion of the canine deterrent device to maximize the sound emissions to provide an effective sound shield, where such changes would be without departing from the scope of the invention.

Supporting the head portion 408 of the first shell 404 and second shell 406 of the main body 102 of the canine deterrent device 100 is a pair of support arms 428 that make up the shoulder portion 410 of the instant device. As illustrated, the support arms 428 may comprise a pair of flaring arms that are narrow at a first end and wider at a second end. Attached to a bottom end of the neck portion 410 is a handle portion 412. The handle portion 412, in one exemplary embodiment, comprises a handle body 130 that may include one or more handle grooves 432 for griping purposes. The handle portion 412 includes a compartment 134 for storing electrical components, such as a power source 206 and a microprocessor 300, a compartment cover for covering the compartment and a security mechanism for securing the compartment cover to the compartment to secure the electrical components therein (See FIG. 3).

Turning to FIGS. 6 and 7, the canine deterrent device 100 includes a camera 462, one or more LEDs 464 for illumination purposes, a microphone 466, and a speaker 468, all of which are in communication with the processor 300 of the canine deterrent device 300. The LEDs 464 of the canine deterrent device 400 are controlled by the LED module 312 of the processor 300. In one exemplary embodiment, the LEDs may automatically turn on/off when a canine is detected by the camera 462 in communication with the object recognition module 306 of the present invention (but more on how that works later). The LEDs may emit light in any color spectrum and emit the light in an array of light effects, e.g., flickering, intermittent, or in a preprogrammed sequential order. Similarly, speaker 468 of the canine deterrent device 400 is in communication with the processor 300 of the present device. Speaker 468 is configured to emit sound audible to the user.

The camera 462 and the object recognition module 306 of the processor 300, in one exemplary embodiment, include hardware and software for identifying objects in real-time utilizing machine learning and deep learning tools. The object recognition module 306 performs several tasks when recognizing an object, including classifying the image type captured by camera 462. Image classification may involve localization which includes identifying a bounding perimeter around the one or more objects in an image. For instance, image classification involves capturing and recognizing the outline of an animal (e.g., a canine). After the object is detected, the module 306 segments the object. Segmentation is where the specific pixels of the image of the object is recognized to identify unique structural or visual features. Identifiable features include but are not limited to the outline of animals, facial features, including the eyes, snout, ears, body, and other identifiable portions of an animal. The objects recognized by the object recognition module are analyzed by the analytics machine 304 for learning purposes.

For example, in the instant case where a user is blind and is walking outside of their home, the camera 462 of the canine deterrent device 400 captures an object and transmits the image, in the form of data, to the object recognition module 306. The object recognition module 306 performs the tasks outlined above to detect and identify the object in question, or in this case, a canine. In one exemplary embodiment, the object recognition module 462 has a detection distance of 25 feet. The object recognition module 306 is also in communication with the analytics machine 304 of the processor 300. The information shared between the components is utilized to emit an effective sound beam that creates an effective sound shield against the canine. When the canine 222 is detected, one or more actions may occur. For instance, in a first example, the sound emitting module 308 automatically activates speaker 468 to emit an audible alarm to the user. The audible alarm may include a voice warning the user of an approaching canine. In another exemplary embodiment, the LED control module 312, may automatically activate the LEDs 416 on the canine deterrent device 400. In addition to the activation of the LEDs or speaker, the transducers 200 of the canine deterrent device 400 automatically emit a sound wave beam 224 that combined produces a sound shield 226 that wards off the canine 222 from approaching the user (FIG. 5). In one exemplary embodiment, the sound wall may maintain the canine a distance of at least 3 feet from the user.

In summary, the canine deterrent device combines several components to provide a powerful deterrent tool against animals. The canine deterrent device provides real-time monitoring and control of canine behavior and prevents unwanted interactions with unfriendly or unknown canines without hurting the canine. The canine deterrent device may also include on or more additional buttons that, when depressed, allow the user to record commands stored in memory and emit those audible sound commands from the speaker of the device to be heard by the canine and be used for obedience training purposes. For instance, the device may include one or more buttons that emit a message for the canine to sit, stay, laydown, or any other variety of commands. It should be understood that audible sound commands are sounds that are distinguishable to the human ear and not only to animals. For instance, audible sounds are sounds that are no lower than 20 Hz.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. An animal deterrent device, comprising:
 a main body that includes a first shell portion removably coupled to a second shell portion, the first shell portion and the second shell portion forming a housing having an internal space;
 a transducer disposed of within the internal space of the housing of the main body, the transducer configured to emit a sound wave;
 a microprocessor in communication with a microphone and the transducer, and configured to execute one or more processes stored in memory, the microprocessor to perform the operations of:
  at a signal processing module, capturing environmental sounds captured by the microphone and processing the environmental sounds as data to enhance and amplify at least one directional sound wave;
  at an analytics machine, automatically analyzing the data to optimize the directional sound wave;

at a sound emitting control module communicating with the signal processing module and analytics machine, sending a signal to the transducer to emit the directional sound wave at a frequency capable of maintaining an animal at a distance; and a power source for powering one or more components of the device.

2. The device of claim 1, wherein the main body includes a head portion, a shoulder portion supporting the head portion, and a handle portion.

3. The device of claim 1, wherein the main body includes a handle having a compartment space and a removable cover securely fastened to the handle to cover the compartment space.

4. The device of claim 3, wherein the microprocessor and power source are disposable within the compartment space.

5. The device of claim 1, wherein the main body includes an oval frame attached to a handle.

6. The device of claim 1, wherein optimizing the directional sound wave includes varying the sound wave's frequency based on the data captured and transmitted by the signal processing module.

7. The device of claim 1, wherein the wave's frequency ranges from 10 kHz to 45 kHz.

8. The device of claim 1, wherein two or more directional sound waves together form a directional sound wall capable of maintaining an animal a distance.

9. The device of claim 1, wherein the distance is no less than 3 feet.

10. The device of claim 1, wherein the power source is connected to a switch capable of interrupting energy supply from the power source to the one or more components powered by the power source.

11. An animal deterrent device, comprising:
a first shell portion removably coupled to a second shell portion to form a frame, the frame comprising:
    a handle portion that includes a compartment space and a removable cover securely fastened to the handle to cover the compartment space;
    a head portion that includes an outer frame with structural supports to provide rigidity;
    a housing compartment disposed of on the head portion; and
    a shoulder portion for supporting the head portion of the frame, the shoulder portion including a pair of flaring arms that are attached to the head portion on a first end and attached to the handle portion on a second end;
a transducer disposed of within the housing on the head portion, the transducer configured to emit a sound wave;
a microprocessor in communication with a microphone and the transducer, and configured to execute one or more processes stored in memory, the microprocessor to perform the operations of:
    at a signal processing module, capturing environmental sounds captured by the microphone and processing the environmental sounds as data to enhance and amplify at least one directional sound wave;
    at an analytics machine, automatically analyzing the data to optimize the directional sound wave;
    at a sound emitting control module communicating with the signal processing module and analytics machine, sending a signal to the transducer to emit the directional sound wave at a frequency capable of maintaining an animal at a distance; and
a power source for powering one or more components of the device.

12. The device of claim 11, wherein optimizing the directional sound wave includes varying the sound wave's frequency based on the data captured and transmitted by the signal processing module.

13. The device of claim 11, wherein the wave's frequency ranges from 10 kHz to 45 kHz.

14. The device of claim 11, wherein two or more directional sound waves together form a directional sound wall capable of maintaining an animal a distance.

15. The device of claim 14, wherein the distance is no less than 3 feet.

16. An animal deterrent device, comprising:
a main body that includes a first shell portion removably coupled to a second shell portion, the first shell portion and the second shell portion forming a housing having an internal space;
a transducer disposed of within the internal space of the housing of the main body, the transducer configured to emit a sound wave;
a camera disposed of within the internal space of the main body;
a speaker disposed of within the internal space of the main body;
a microprocessor in communication with a microphone, the speaker, the transducer, and the camera, and configured to execute one or more processes stored in memory, the microprocessor to perform the operations of:
    at a signal processing module, capturing environmental sounds captured by the microphone and processing the environmental sounds as data to enhance and amplify at least one directional sound wave;
    at an analytics machine, automatically analyzing the data to optimize the directional sound wave;
    at a sound emitting control module communicating with the signal processing module and analytics machine, sending a signal to the transducer to emit the directional sound wave at a frequency capable of maintaining an animal at a distance;
    at an object recognition module, receiving image data captured by the camera and comparing the data against known object values stored in memory, and initiating a determining step:
        wherein if the data does not include a known object value, nothing occurs,
        wherein if the data includes a known object value, the sound emitting control module is signaled to automatically send a signal to the transducer to emit the directional sound wave;
a power source for powering one or more components of the device; and
a switch capable of interrupting energy supply from the power source powering the one or more components.

17. The device of claim 16, wherein a plurality of LEDs is disposed of on the main body, with the LEDs electronically communicating with the microprocessor.

18. The device of claim 16, wherein the wave's frequency ranges from 10 kHz to 45 kHz.

19. The device of claim 16, wherein the wave's frequency is dependent upon the object value identified by the object recognition module.

20. The device of claim 16, wherein the object recognition module can detect an object up to 25 feet away.

* * * * *